United States Patent
Werner et al.

(10) Patent No.: US 8,355,754 B1
(45) Date of Patent: *Jan. 15, 2013

(54) OPERATING A COMPUTING DEVICE WITH AN OPERATING SYSTEM AND A WIRELESS DATA ACCESS ON A MOBILE DEVICE

(75) Inventors: Shane R. Werner, Olathe, KS (US); Warren B. Cope, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 458 days.

This patent is subject to a terminal disclaimer.

(21) Appl. No.: 12/704,380

(22) Filed: Feb. 11, 2010

Related U.S. Application Data

(63) Continuation of application No. 11/456,951, filed on Jul. 12, 2006, now Pat. No. 7,738,920.

(51) Int. Cl.
*H04B 3/18* (2006.01)

(52) U.S. Cl. ......... 455/557; 455/418; 455/419; 709/248

(58) Field of Classification Search ............... 455/557, 455/418, 419; 709/248
See application file for complete search history.

(56) References Cited

U.S. PATENT DOCUMENTS

| | | | |
|---|---|---|---|
| 2003/0037254 A1* | 2/2003 | Fischer et al. | 713/200 |
| 2003/0200350 A1* | 10/2003 | Kumar et al. | 709/315 |
| 2006/0036555 A1* | 2/2006 | Beck et al. | 705/75 |
| 2006/0253340 A1* | 11/2006 | Levchin et al. | 705/26 |
| 2007/0035611 A1* | 2/2007 | Wu | 348/14.01 |
| 2007/0053367 A1* | 3/2007 | Tyebji | 370/401 |
| 2007/0119953 A1* | 5/2007 | Tsao | 235/492 |

* cited by examiner

*Primary Examiner* — Danh Le

(57) ABSTRACT

A method, system, and medium are provided for operating a computing device using an operating system (OS) installed on a mobile device, or operating the computing device using the OS installed on the mobile device and accessing the Internet through the mobile device. An OS is pre-installed on a mobile device. A computing device that is connected to the mobile device may initialize and operate the OS installed on the mobile device. In another embodiment, the computing device may operate the OS and access the Internet through the mobile device.

16 Claims, 4 Drawing Sheets

OPERATING A COMPUTING DEVICE WITH AN OPERATING SYSTEM AND A WIRELESS DATA ACCESS ON A MOBILE DEVICE

CROSS-REFERENCE TO RELATED APPLICATIONS

This application is a Continuation of U.S. application Ser. No. 11/456,951, filed on Jul. 12, 2006, which is herein incorporated by reference.

STATEMENT REGARDING FEDERALLY SPONSORED RESEARCH OR DEVELOPMENT

Not applicable.

BACKGROUND

Over the years, the capacity of mobile devices has increased dramatically with many devices having large amounts of storage. It is not uncommon to have mobile devices with memory capacities in the gigabyte range. With such large capacities, these mobile devices may store a variety of information including computer software.

One of the challenges that users face today is having the ability to migrate information from one computing device to another computing device. Usually, a user has to install an operating system and data files onto a computing device in order to use the computing device. However, if the user is mobile and needs to use a second computing device, the user has to find a way to operate the second computing device and use data files that may be stored on the first computing device.

The first challenge is for the user to operate the second computing device. The user has to gain access to the second computing device which may have a security access, especially if the user does not own the second computing device. If the security access exists, the user will be prevented for accessing the second computing device unless the user has a login and password. Even with access to the second computing device, the user has to be concerned that the proper operating system exists that will allow the second computing device to operate in accordance with the user's requirements or preferences. Today, a computing device may operate several types of operating systems each having its own unique functionality. For example, a computing device may operate the WINDOWS 2000 operating system by the Microsoft Corporation of Redmond, Wash. The same computing device may also operate the LINUX operating system. Both operating systems have unique characteristics and functionalities although they may operate on the same computing device. The user may have a particular need or preference for one type of operating system over another which many not be the operating system loaded onto the second computing device discussed above.

Another challenge for the user, even after gaining access to the second computing device, is to have access to the data files that were originally stored on the first computing device. The current method for accessing such data files is to store the data files on a removable media device such as a floppy disk, a CD, a flash memory (such as a USB memory), or a removable disk drive. The user can store the data files on the removable media device and later use the removable media device with the second computing device. Unfortunately, the user has to maintain the most recent version of the data files either on the first computing device or on the removable media device. At some point, these two devices may need to be synchronized to have the same data. Secondly, the user has to take care not to damage the removable media device. Thirdly, the removable media device has to be small enough to not distract the user when it is moved from place to place. If the removable media device is too bulky or cumbersome, the user may not find the removable media device practical and may lose interest in using such device.

For the reasons discussed above, a solution is needed that allows a user to use his or her own operating system even when the user is using different types of computing devices. The solution needs to allow the user to access the user's data files without the need for a removable media device. The solution also needs to allow the user to access the Internet from the different types of computing devices while using the operating system.

SUMMARY

The presenting invention is defined by the claims below. Embodiments of the present invention solve at least the above problems by providing a system and method for, among other things, operating a computing device using an operating system (OS) installed on a mobile device, or operating the computing device using the OS installed on the mobile device and accessing the Internet through the mobile device.

In a first aspect, a computer system having a processor and a memory for executing a method for operating a computing device while executing an operating system (OS) installed on a mobile device is provided that includes communicating between the computing device and the mobile device over a connection. The computing device is initialized with the OS installed on the mobile device. The computing device operates with the OS. Data files are accessed from either or both the mobile device or the computing device.

In another aspect, a computer system having a processor and a memory for executing a method for operating a computing device with a data access while executing an operating system (OS) installed on a mobile device is provided that includes communicating between the computing device and the mobile device over a connection. The computing device is initialized with the OS installed on the mobile device. The computing device operates with the OS. Data files are accessed from either or both the mobile device or the computing device. The computing device accesses a packet network through the mobile device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
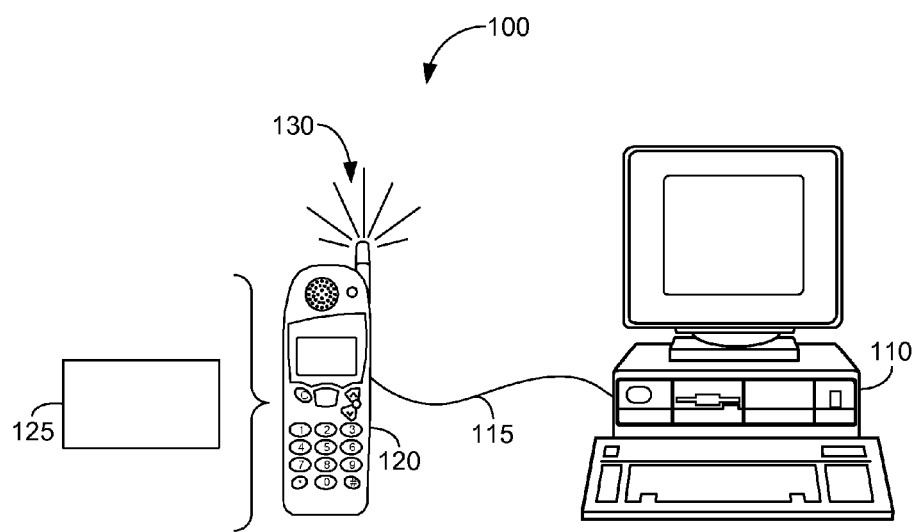
FIG. 1 is a block diagram of an exemplary operating environment illustrating a computing device using an operating system installed on a mobile device.

Embodiments of the present invention provide systems and methods for operating a computing device using an OS installed on a mobile device.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AAA | Authentication, Authorization, and Accounting |
| BLUETOOTH | Technology for connecting devices using a short-ranged wireless connection. |
| CD | Compact Disk |
| CDMA | Code Division Multiple Access |
| EDGE | Enhance Data Rates for GSM (and TDMA) Evolution |
| EV-DO | Evolution Data Only or Evolution Data Optimized |
| GPRS | General Packet Radio Services |
| GSM | Global System for Mobile Communications |
| IP | Internet Protocol |
| OS | Operating System |
| PDA | Personal Digital Assistant |
| UMTS | Universal Mobile Telephone System |
| USB | Universal Serial Bus |
| W-CDMA | Wide Code Division Multiple Access |
| WiFi | Wireless Fidelity (802.11 network) |
| WiMAX | Worldwide Interoperability for Wireless Access (802.16 network) |
| ZIGBEE | Technology for connecting devices using a short-ranged wireless connection. |

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Mobile Device with OS and Wireless Data Access for Computing Device

Embodiments of the present invention may be implemented to allow a user to operate a computing device using an OS installed on a mobile device. Other embodiments may be implemented that allow the user to operate the computing device with the OS installed on the mobile while at the same time allowing the user to access the Internet.

In FIG. 1, an exemplary operating environment 100 is shown with a computing device 110 connected to a mobile device 120 over a connection 115. The computing device 110 may be a computer, a workstation, a server, or a PDA. The mobile device 120 may be a mobile phone, handheld computer, or a PDA. The connection 115 may be a USB connection, an Ethernet connection, a serial port connection, a parallel port connection, or a wireless connection. The wireless connection may include BLUETOOTH, infrared, WiFi, and WiMax to name a few. The types of computing devices, mobile device, and connections listed above are not exhaustive and may be include others not mentioned in this specification.

Within mobile device 120, an OS 125 may be stored in the memory of mobile device 120. OS 125 may be the operating system or a combination of the operating system and data files. For example, OS 125 may represent the WINDOWS XP operating system from the Microsoft Corporation of Redmond, Wash. However, OS 125 may represent the WINDOWS XP operating system and an application such as the REALPLAYER program from REALNETWORKS, INC. of Seattle, Wash. As discussed above, mobile device 120 has significant capacity to store an operating system and data files.

Signal 130 illustrates the wireless capability of mobile device 120. Although not shown here, mobile device 120 may communicate using a variety of wireless technologies including, but not limited to, CDMA, GPRS, GSM, EDGE, EV-DO, W-CDMA, UMTS, WiFi, and WiMax. The transmit and receive capabilities using these technologies will go through the exemplary signal 130.

Figure 2:
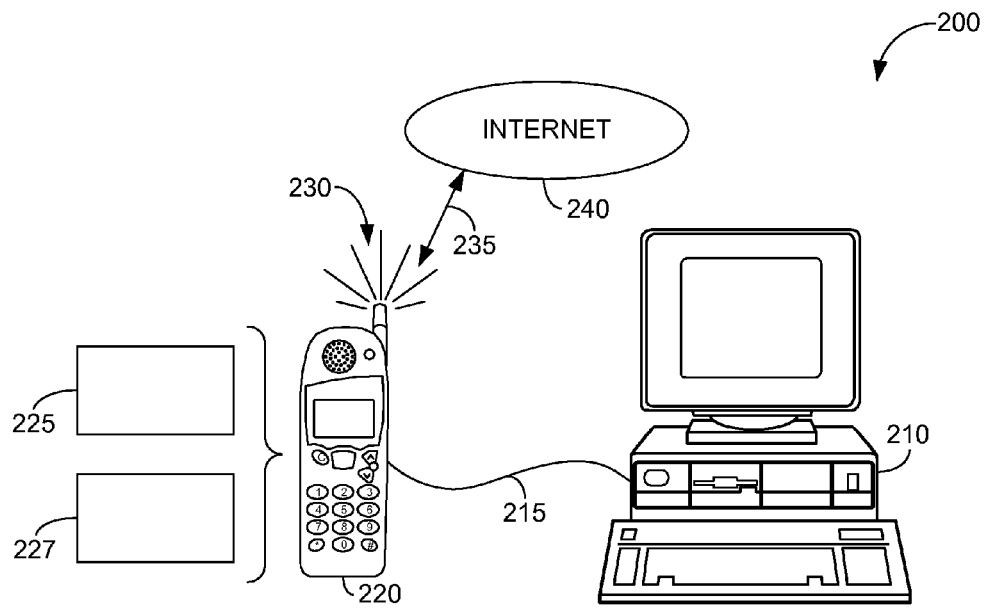
FIG. 2 is a block diagram of an exemplary operating environment illustrating a computing device using an operating system installed on a mobile and accessing the Internet through the mobile device.

Turning now to FIG. 2, an exemplary operating environment 200 is shown similar to FIG. 1. A computing device 210 is connected to a mobile device 220 over a connection 215. The computing device 210 represents the same computing device as computing device 110. The connection 215 represents the same connection as connection 115. The mobile device 220 represents and includes the same functionality as mobile device 120 with an addition. Mobile device 220 includes a data access 227. OS 225 represents the same functions as OS 125.

Data access 227 allows mobile device 220 to access the Internet 240 over a connection 235. Connection 235 represents the various devices and signals that are involved in order to allow mobile device 220 to connect to the Internet 240. The discussion of how mobile device 220 connects to the Internet 240 is beyond the scope of this invention and shall not be discussed here. However, one of ordinary skill in the art understands that in today's technologies, home agents, foreign agents, and AAA servers may be involved as part of connection 235 to provide data access 227 to the Internet 240.

With FIGS. 1 and 2, embodiments of the present invention may be implemented using the processes discussed below in FIGS. 3, 4, and 5.

Figure 3:
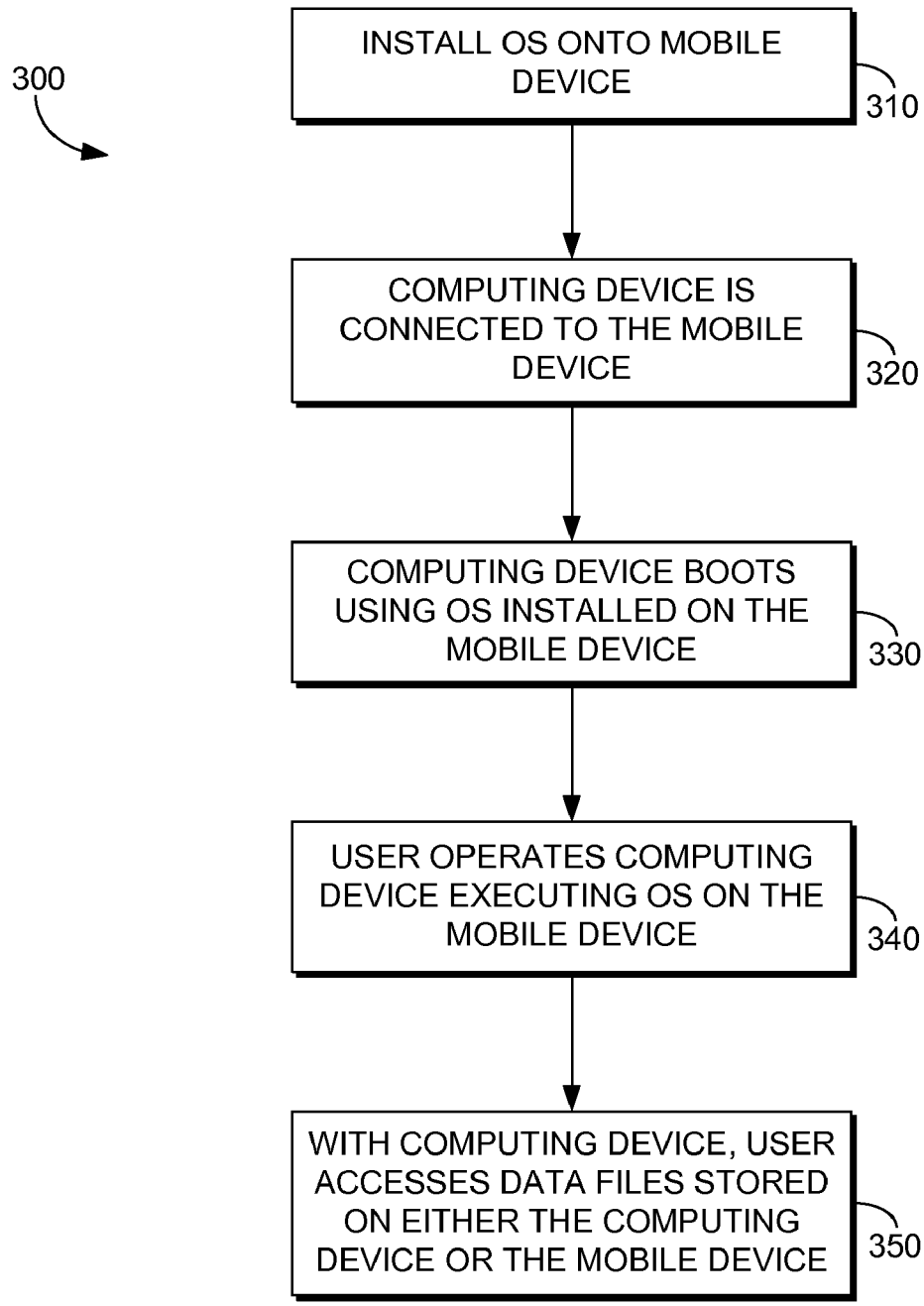
FIG. 3 is a flowchart of an exemplary process for operating a computing device using an operating system installed on a mobile device.

In FIG. 3, a process for operating a computing device using an operating system installed on a mobile device is provided in a method 300. In a step 310, OS 125 is installed in mobile device 120. Although not shown here, the installation of OS 125 is similar to installing computer software on a computing device. Various techniques may be used to install OS 125. Some of which may include the receipt of OS 125 over a wireless connection.

In a step 320, computing device 110 is connected to mobile device 120 using the various connections (connection 115) discussed above in FIG. 1. This connection enables computing device 110 and mobile device 120 to communicate together.

After OS 125 is installed in mobile device 120 in step 310, computing device 110 is initialized in a step 330 using OS 125 installed on mobile device 120. In an embodiment of the present invention, mobile device 120 may appear as a letter drive that is accessible by computing device 110 for the initialization. In another embodiment, a user may have an option to select an external device such as mobile device 120 for the boot sequence.

In a step 340, a user operates computing device 110 with OS 125 from mobile device 120. In this step, the physical operating system does not have to be stored on computing device 110. Instead, the operating system may be kept in mobile device 120. As the user operates computer device 110, the user may access data files that may be stored on computing device 110 or stored on mobile device 120. As discussed earlier, one embodiment of the present invention may implement OS 125 as an operating system only while another embodiment of the present invention may implement OS 125 as an operating system and data files. The example discussed above shows that OS 125 could be the WINDOWS XP operating system and the REALPLAYER program.

In a scenario about the present invention, a user owns a mobile phone such as mobile device 120 with a large storage capacity in the gigabyte range. The user loads the WINDOWS XP operating system onto the mobile phone. The user also loads several applications and other files onto the mobile phone since the storage area can hold a large amount of data. A few weeks later, while traveling away from home, the user desires to use a computer located in a hotel business center. The user connects the mobile phone to the hotel's computer using a USB cable. The user turns on the computer and the computer displays to the user the option of booting from several sources. The user chooses the source associated with the mobile phone. The computer boots from the operating system stored on the mobile phone. After the boot sequence is completed, the user operates the computer to locate data files stored on the mobile phone. In some cases, the data files may appear as part of a disk drive letter appearing in the computer's hardware hierarchy. Furthermore, the user may continue to use the computer with the mobile phone appearing as another disk drive.

Figure 4:
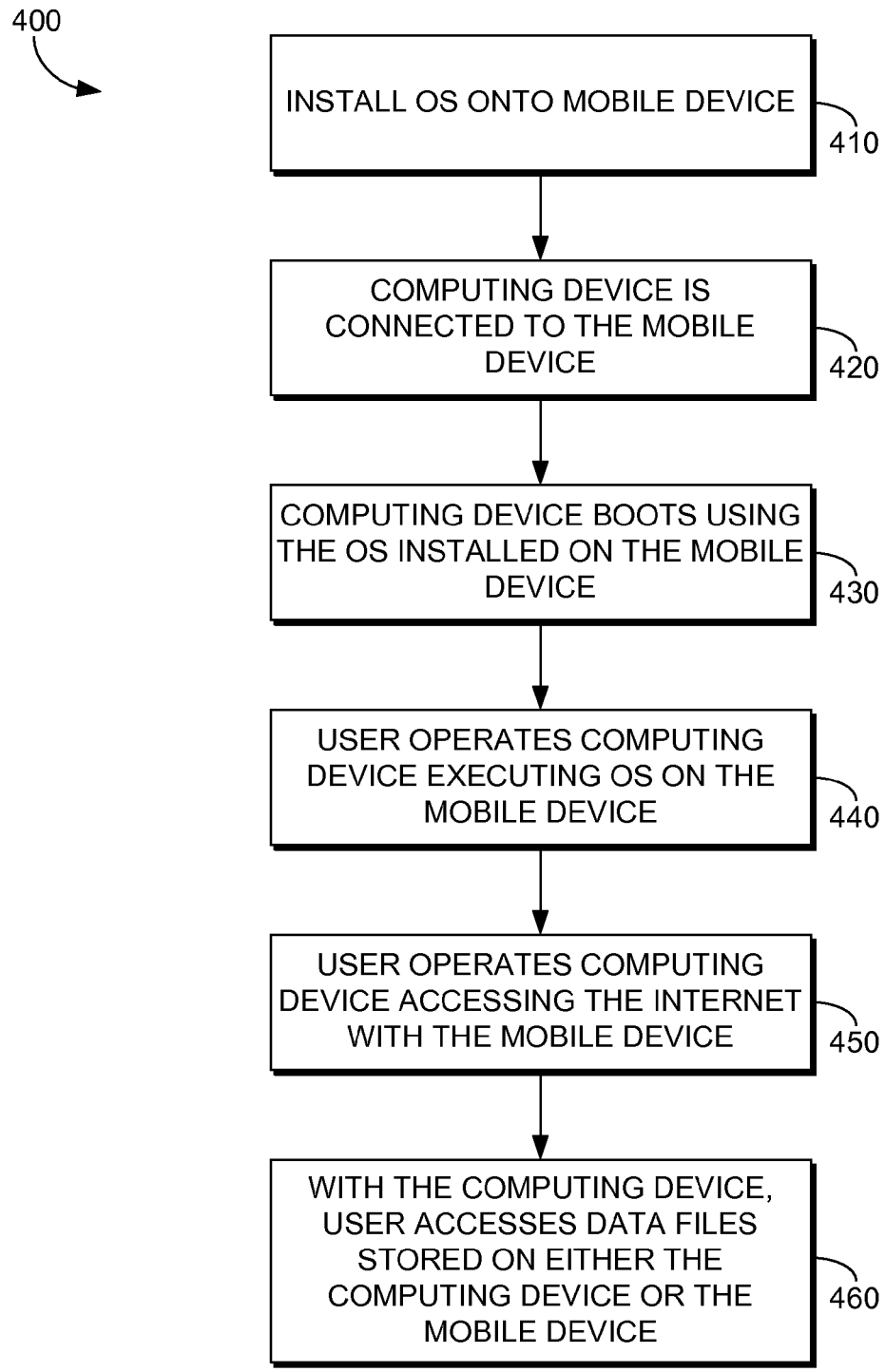
FIG. 4 is a flowchart of an exemplary process for operating a computing device using an operating system installed on a mobile device and accessing the Internet through the mobile device.

Turning now to FIG. 4, a process for operating a computing device using an operating system installed on a mobile device and accessing the Internet through the mobile device is shown in a method 400. Method 400 is similar to method 300 with some additions. Method 400 includes an ability of mobile phone 120 to provide data access as shown in mobile phone 220.

In a step 450, a user operates computing device 210 to access the Internet 240 through mobile device 220. To facilitate this access, mobile phone 220 has data access 227 and connection 235 indicating the capability to access the Internet 240. Step 450 illustrates that mobile device 220 may provide OS 225 to computing device 210 while at the same time provide internet access. Steps 410, 420, 430, 440, and 450 are similar to steps 310, 320, 330, 340, and 350, and are not discussed further.

Going back to the scenario discussed above but with FIG. 2, while the user is operating the computer with OS 225 in this case, the user may desire to access the Internet 240. The user may initialize a web browser program that is either stored on the computer or stored on the mobile phone as part of OS 225. The mobile phone handles the connections to the Internet 240 and enables the web data to be transferred to the computer rather than on the display of the mobile phone. Therefore, the user may operate the computer with the operating system while also accessing the Internet.

Figure 5:
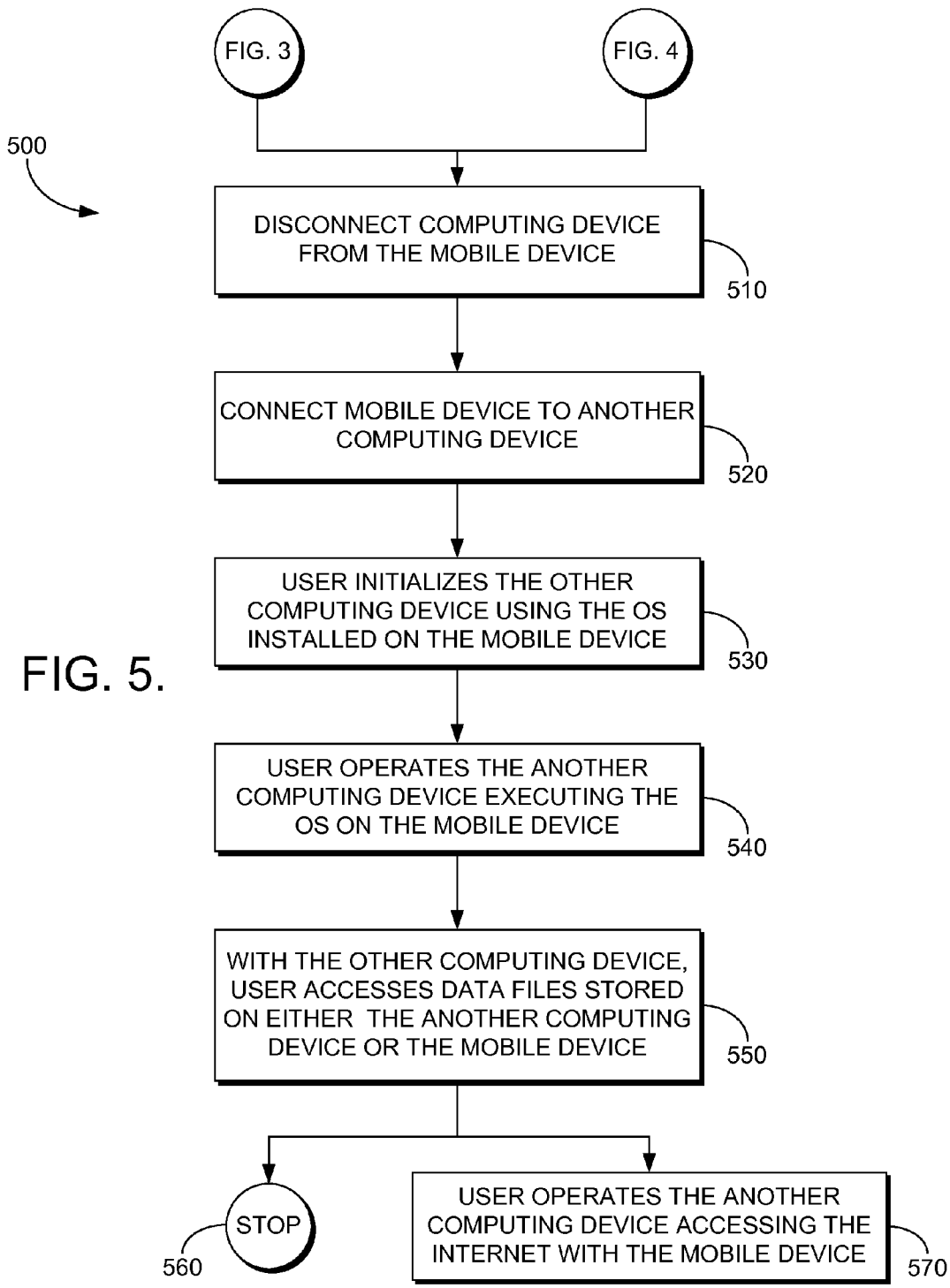
FIG. 5 is a flowchart of an exemplary process for terminating an operation of a computing device using an operating system on a mobile device and operating another computing device using the operating system on the mobile device.

In FIG. 5, a process for terminating an operation of a computing device using an operating system on a mobile device and operating another computing device using the operating system on the mobile device is shown in a method 500. Method 500 begins as a continuation of the steps in FIGS. 3 and 4.

After the user completes operating either computing device 110 or 210, the user may disconnect the computing device from the mobile device in a step 510. As discussed above, the operating system is stored on the mobile device and some or all of the data files may be stored on the mobile device. Later, the user desires to use another computing device and connects the mobile device to this new computing device as shown in a step 520. The user initializes the new computing device using the OS installed on the mobile device in a step 530. The user operates the new computing device using the OS on the mobile device in a step 540. In a step 550, the user accesses data files from either the new computing device or the mobile device. In a step 570, the user accesses the Internet 240 while also operating computing device 110 or 210.

As shown in the steps 510-550, the user has reconnected to the new computing device illustrating that the functionality that the user had in methods 300 and 400, in respective FIGS. 3 and 4, may be used again in method 500. The mobile device acts as the storage device which may be connected to different computing devices. Method 500 illustrates that the user may use different computing devices but still have an ability use the same operating system and data files.

The prior discussion is only for illustrative purposes to convey exemplary embodiments. The steps discussed in FIGS. 3, 4 and 5 may be executed without regards to order. Some steps may be omitted and some steps may be executed at a different time than shown. For example, step 350 may be executed before step 340. Step 570 may be executed before step 550. The point here is to convey that the figures are merely exemplary for the embodiments of the present invention and that other embodiments may be implemented for the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media containing thereon computer-readable code for operating one or more computing devices with an operating system (OS) installed on a mobile device, comprising:
communicating between a computing device and the mobile device over a connection;
initializing the computing device with the OS installed on the mobile device;
operating the computing device with the OS on the mobile device;
accessing one or more data files from at least one of the mobile device or the computing device;
disconnecting the mobile device from the computing device;
reconnecting the mobile device to another computing device;
initializing the another computing device with the OS installed on the mobile device; and
operating the another computing device with the OS wherein the one or more data files are accessed from at least one of the mobile device or the another computing device.

2. The media of claim 1, wherein the connection is selected from a group including a USB connection, an Ethernet connection, a serial port connection, a parallel port connection, and a wireless connection.

3. The media of claim 2, wherein the wireless connection is selected from a group including Bluetooth, infrared, WiFi, and WiMax.

4. The media of claim 1, wherein the one or more data files are selected from a group including a user's files, an application, and a software program.

5. The media of claim 1, further comprising making a telephone call using at least one of the mobile device or a software program on the computing device.

6. One or more non-transitory computer-readable media containing thereon computer-readable code for operating one or more computing devices with a data access while executing an operating system (OS) installed on a mobile device, comprising:
communicating between a computing device and the mobile device over a connection;
initializing the computing device with the OS installed on the mobile device;
operating the computing device with the OS on the mobile device;
accessing one or more data files from at least one of the mobile device or the computing device;
accessing from the computing device a packet network through the mobile device;
disconnecting the mobile device from the computing device;
reconnecting the mobile device to another computing device;
initializing the another computing device with the OS installed on the mobile device;
operating the another computing device with the OS wherein the one or more data files are accessed from at least one of the mobile device or the another computing device; and
accessing from the another computing device a packet network through the mobile device.

7. The media of claim 6, wherein the connection is selected from a group including a USB connection, an Ethernet connection, a serial port connection, a parallel port connection, and a wireless connection.

8. The media of claim 7, wherein the wireless connection is selected from a group including Bluetooth, infrared, WiFi, and WiMax.

9. The media of claim 6, wherein the one or more data files are selected from a group including a user's files, an application, and a software program.

10. The media of claim 6, further comprising making a telephone call using at least one of the mobile device or a software program on the computing device.

11. The media of claim 6, wherein the packet network is selected from a group including the Internet.

12. One or more non-transitory computer-readable media containing thereon computer-readable code for causing a mobile device to perform a method for providing an access to an operating system (OS) and a packet network, the method comprising:
providing a communication connection between the mobile device and a computing device;
facilitating an operation of the OS, stored on the mobile device, to initialize and operate the computing device;
providing an access to the packet network during the facilitation of the operation of the OS;
disconnecting the mobile device from the computing device;
reconnecting the mobile device to another computing device;
initializing the another computing device with the OS installed on the mobile device;
operating the another computing device with the OS wherein the one or more data files are accessed from at least one of the mobile device or the another computing device; and
accessing from the another computing device the packet network through the mobile device.

13. The media of claim 12, wherein the connection is selected from a group including a USB connection, an Ethernet connection, a serial port connection, a parallel port connection, and a wireless connection.

14. The media of claim 13, wherein the wireless connection is selected from a group including Bluetooth, infrared, WiFi, and WiMax.

15. The media of claim 12, wherein the packet network is selected from a group including the Internet.

16. The media of claim 12, further comprising making a telephone call with the mobile device.

* * * * *